US012561191B2

(12) United States Patent
Sun et al.

(10) Patent No.: US 12,561,191 B2
(45) Date of Patent: Feb. 24, 2026

(54) TRAINING METHOD AND APPARATUS FOR FAULT RECOGNITION MODEL, FAULT RECOGNITION METHOD AND APPARATUS, AND ELECTRONIC DEVICE

(71) Applicant: BEIJING BAIDU NETCOM SCIENCE TECHNOLOGY CO., LTD., Beijing (CN)

(72) Inventors: Zhuo Sun, Beijing (CN); Tianxing Yang, Beijing (CN); Chen Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 838 days.

(21) Appl. No.: 17/867,680

(22) Filed: Jul. 18, 2022

(65) Prior Publication Data

US 2022/0350690 A1     Nov. 3, 2022

(30) Foreign Application Priority Data

Aug. 20, 2021    (CN) .......................... 202110963367.3

(51) Int. Cl.
*G06N 20/00* (2019.01)
*G06F 11/07* (2006.01)
*G06F 40/20* (2020.01)

(52) U.S. Cl.
CPC ........ *G06F 11/079* (2013.01); *G06F 11/0709* (2013.01); *G06F 40/20* (2020.01); *G06N 20/00* (2019.01)

(58) Field of Classification Search
CPC .... G06F 11/079; G06F 11/0709; G06F 40/20; G06F 40/157; G06F 40/216;
(Continued)

(56) References Cited

U.S. PATENT DOCUMENTS

2020/0327446 A1* 10/2020 Jia ............................. G06N 3/08
2020/0327654 A1* 10/2020 Zhang .................... G06N 3/091
(Continued)

FOREIGN PATENT DOCUMENTS

CN        110245233 A       9/2019
CN        111428008 A       7/2020
(Continued)

OTHER PUBLICATIONS

Abdelgayed, Tamer S., Walid G. Morsi, and Tarlochan S. Sidhu. "Fault detection and classification based on co-training of semisupervised machine learning." IEEE Transactions on Industrial Electronics 65.2 (2017): 1595-1605 (Year: 2017).*

(Continued)

*Primary Examiner* — Andrew T McIntosh
(74) *Attorney, Agent, or Firm* — MASCHOFF BRENNAN; Younghwan Lee; Liang Huang

(57) ABSTRACT

Provided are a training method and apparatus for a fault recognition model, a fault recognition method and apparatus, an electronic device, and a medium. A training method for a fault recognition model includes: obtaining a first fault data set; generating a first sample set based on the first fault data set, where each sample in the first sample set includes a fault description text, a corresponding faulty part, and a corresponding fault type; and adjusting parameters of a fault recognition model by using the fault description text of the sample in the first sample set as an input to the fault recognition model, such that the fault recognition model outputs a first label and a second label, where the first label is the faulty part corresponding to the input fault description text, and the second label is the fault type corresponding to the faulty part.

16 Claims, 6 Drawing Sheets

200

(58) Field of Classification Search

CPC ........ G06F 40/247; G06F 40/30; G06F 40/58;
G06F 18/214; G06F 18/241; G06N 20/00;
G06N 3/08; G06N 3/0499; G06N 3/09;
G06Q 10/06395; G06Q 10/20; G06Q
10/06311; G06Q 10/103

See application file for complete search history.

(56) References Cited

U.S. PATENT DOCUMENTS

| | | | | |
|---|---|---|---|---|
| 2021/0018347 | A1* | 1/2021 | Khoury | G06N 3/044 |
| 2021/0055719 | A1* | 2/2021 | Zheng | G05B 23/0283 |
| 2021/0232800 | A1* | 7/2021 | Wohlfeld | G06F 18/2155 |
| 2021/0279525 | A1* | 9/2021 | Goyal | G06V 10/776 |
| 2021/0295213 | A1* | 9/2021 | Raveh | G06V 10/774 |
| 2021/0319156 | A1* | 10/2021 | He | G06N 3/09 |
| 2022/0058440 | A1* | 2/2022 | Feng | G06N 3/091 |
| 2022/0300860 | A1* | 9/2022 | Guo | G06F 17/18 |

FOREIGN PATENT DOCUMENTS

| | | |
|---|---|---|
| CN | 111651601 A | 9/2020 |
| CN | 112560912 A | 3/2021 |
| CN | 112560997 A | 3/2021 |
| CN | 112613584 A | 4/2021 |
| CN | 112884018 A | 6/2021 |

OTHER PUBLICATIONS

Guo, Liang, et al. "Deep convolutional transfer learning network: A new method for intelligent fault diagnosis of machines with unlabeled data." IEEE Transactions on Industrial Electronics 66.9 (2018): 7316-7325 (Year: 2018).*

Zhang, Zhi-Wu, Xiao-Yuan Jing, and Tie-Jian Wang. "Label propagation based semi-supervised learning for software defect prediction." Automated Software Engineering 24.1 (2017): 47-69 (Year: 2017).*

Qiang Zhang et al., A TextCNN Based Approach for Multi-label Text Classification of Power Fault Data, IEEE 5th International Conference on Cloud Computing and Big Data Analytics, 2020, pp. 179-183.

Junyu Zhou et al., A Classification Model of Power Equipment Defect Texts Based on Convolutional Neural Network, ICAIS 2019, LNCS 11632, pp. 475-487, Springer Nature Switzerland AG.

Ziyue Xi et al., A Novel Ensemble Approach to Multi-label Classification for Electric Power Fault Diagnosis, IEEE 7th International Conference on Computer Science and Network Technology, 2019, pp. 267-271.

Ping et al., Research on fault identification based on improved deep model in combination of generative adversarial networks under unbalanced data sets, Journal of Electronic Measurement and Instrumentation, Mar. 2019, vol. 33, No. 3, 8 pages.

* cited by examiner

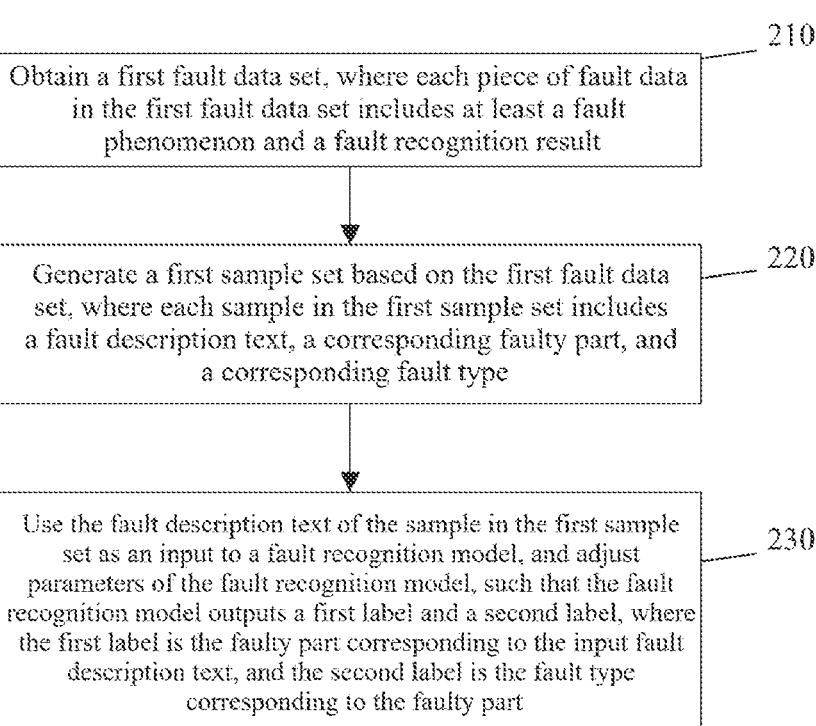

200

Obtain a first fault data set, where each piece of fault data in the first fault data set includes at least a fault phenomenon and a fault recognition result — 210

Generate a first sample set based on the first fault data set, where each sample in the first sample set includes a fault description text, a corresponding faulty part, and a corresponding fault type — 220

Use the fault description text of the sample in the first sample set as an input to a fault recognition model, and adjust parameters of the fault recognition model, such that the fault recognition model outputs a first label and a second label, where the first label is the faulty part corresponding to the input fault description text, and the second label is the fault type corresponding to the faulty part — 230

Obtain a first text, where the first text is a text for
describing a fault phenomenon

320

Input the first text to a fault recognition model to obtain
an output result, where the output result includes a
faulty part and a fault type specific to the faulty part

400

410

Obtain a list of parts and a list of fault types of the parts based on fault data

420

Obtain a sample data set

430

Provide data in a minority class as a supplement

440

Train a classification model

450

Recognize a fault by using the model, and optionally, supplement a fault database by using the recognized fault

460

Update the model based on new data

500

| Work order obtaining unit    510 |

| Sample generation unit    520 |

| Model training unit    530 |

600

| Text obtaining unit    610 |

| Fault recognition unit    620 |

TRAINING METHOD AND APPARATUS FOR FAULT RECOGNITION MODEL, FAULT RECOGNITION METHOD AND APPARATUS, AND ELECTRONIC DEVICE

CROSS REFERENCE TO RELATED APPLICATION

This application claims priority to Chinese Patent Application No. 2021109633673, filed on Aug. 20, 2021, the contents of which are hereby incorporated by reference in their entirety for all purposes.

TECHNICAL FIELD

The present disclosure relates to the technical field of artificial intelligence, especially relates to deep learning, and in particular to a training method and apparatus for a fault recognition model, a fault recognition method and apparatus, an electronic device, a computer-readable storage medium, and a computer program product.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies. A method for recognizing a fault type by using an artificial intelligence technology is expected, to enable technical personnel to less depend on manual recognition of a device fault.

The method described in this section is not necessarily a method that has been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a training method and apparatus for a fault recognition model, a fault recognition method and apparatus, an electronic device, a computer-readable storage medium, and a computer program product.

According to an aspect of the present disclosure, there is provided a training method for a fault recognition model, the method including: obtaining a first fault data set, where each piece of fault data in the first fault data set includes at least a fault phenomenon and a fault recognition result; generating a first sample set based on the first fault data set, where each sample in the first sample set includes a fault description text, a corresponding faulty part, and a corresponding fault type; and training a fault recognition model by using a subset of the first sample set to obtain the following fault recognition model, where the fault recognition model can output a first label and a second label as results when a first text is received as an input, where the first label is a faulty part corresponding to the first text, and the second label is a fault type corresponding to the faulty part.

According to an aspect of the present disclosure, there is provided an electronic device, including: at least one processor; and a memory communicatively connected to the at least one processor, where the memory stores instructions executable by the at least one processor, and when executed by the at least one processor, the instructions cause the at least one processor to perform the training method for a fault recognition model according to the embodiments of the present disclosure or the fault recognition method according to the embodiments of the present disclosure.

According to an aspect of the present disclosure, there is provided a non-transitory computer-readable storage medium storing computer instructions, where the computer instructions are used to cause the computer to perform the training method for a fault recognition model according to the embodiments of the present disclosure or the fault recognition method according to the embodiments of the present disclosure.

According to one or more embodiments of the present disclosure, a fault can be effectively recognized based on description of a fault phenomenon, and an output result may be a faulty part and a fault type belonging to or corresponding to the faulty part.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The drawings show example embodiments and form a part of the specification, and are used to explain example implementations of the embodiments together with a written description of the specification. The embodiments shown are merely for illustrative purposes and do not limit the scope of the claims. Throughout the drawings, identical reference signs denote similar but not necessarily identical elements.

FIG. 2 is a flowchart of a training method for a fault recognition model according to an embodiment of the present disclosure;

DETAILED DESCRIPTION OF EMBODIMENTS

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and conciseness, description of well-known functions and structures are omitted in the following descriptions.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

Embodiments of the present disclosure will be described below in detail in conjunction with the drawings.

Figure 1:
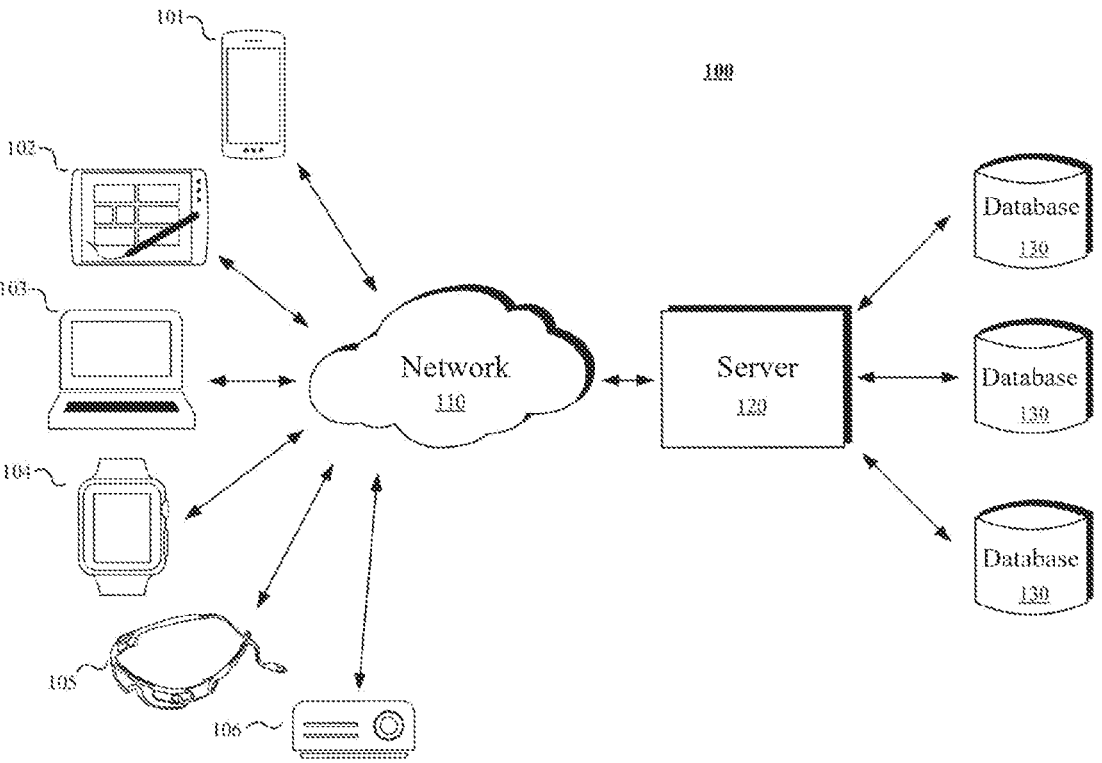
FIG. 1 is a schematic diagram of an example system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more application programs.

In an embodiment of the present disclosure, the server 120 can run one or more services or software applications that enable a training method for a fault recognition model or a fault recognition method to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may use the client device 101, 102, 103, 104, 105, and/or 106 to input training data such as work orders, train the fault recognition model, perform fault recognition, check a recognition result, adjust or feed back the result, and so on. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices can run various types and versions of software application programs and operating systems, such as Microsoft Windows, Apple iOS, a UNIX-like operating system, and a Linux or Linux-like operating system (e.g., Google Chrome OS); or include various mobile operating systems, such as Microsoft Windows Mobile OS, iOS, Windows Phone, and Android. The portable handheld device may include a cellular phone, a smartphone, a tablet computer, a personal digital assistant (PDA), etc. The wearable device may include a head-mounted display and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and a video file. The data repository 130 may reside in various locations. For example, a data repository used by the server 120 may be locally in the server 120, or may be remote from the server 120 and may communicate with the server 120 via a network-based or dedicated connection. The data repository 130 may be of different types. In some embodiments, the data repository used by the server 120 may be a database, such as a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

The following describes, with reference to FIG. 2, a training method 200 for a fault recognition model according to an embodiment of the present disclosure.

At step 210, a first fault data set is obtained. Each piece of fault data in the first fault data set includes at least a fault phenomenon and a fault recognition result.

At step 220, a first sample set is generated based on the first fault data set. Each sample in the first sample set includes a fault description text, a corresponding faulty part, and a corresponding fault type.

At step 230, a fault description text of at least one sample in the first sample set and at least one sample in the second sample set is used as an input to a fault recognition model, and parameters of the fault recognition model are adjusted again.

With the foregoing method 200, a fault can be effectively recognized based on description of a fault phenomenon, and an output result may be a faulty part and a fault type belonging to or corresponding to the faulty part. The following fault recognition model can be obtained, where the fault recognition model can output a first label and a second label as results when a first text is received as an input, where the first label is a faulty part corresponding to the first text, and the second label is a fault type corresponding to the faulty part.

In a common non-limiting example, the first fault data set may be a historical work order data set, including, for example, a maintenance work order, an overhaul work order, a device warranty bill, and an error reporting phenomenon record list, etc. In industrial application scenarios of natural language processing, a large amount of work order information is usually accumulated in maintenance overhaul scenarios for a device (for example, a power plant device). In the work order information, a faulty part and a fault phenomenon of a specific type of device are recorded, an overhaul and experimental record, a real fault cause, and a final solution of the device are indicated, and even overhaul time, overhaul personnel, device number, and the like are recorded in detail. More specifically, each piece of data (for example, work orders) in the first fault data set may be a data record with a fault phenomenon and a fault result that have been determined. Such determination may be performed by operation and maintenance processing personnel on a production line, work order recording parties, fault handling specialists, or other technical personnel by experience, or performed in other ways, and it can be understood that the present disclosure is not limited thereto.

Table 1 shows part names and corresponding fault types (or failure modes) of some examples in an example scenario of a power plant device. In such examples, the first label and the second label may respectively correspond to "electric motor—stall", "transmission mechanism—jamming", "valve rod—deformation", or the like. The first label and the second label may alternatively be referred to as a parent label and a child label, the first label and the second label may be collectively referred to as a "two-level label structure" or the like. It can be understood that the foregoing is an example, and the present disclosure is not limited thereto.

TABLE 1

| Pail name | Fault type |
|---|---|
| Electric motor | Ground fault of windings |
| | DC resistance unbalance of windings |
| | Fault of a contactor |
| | Low insulation |
| | Stall |
| | Fault of a power board |
| Transmission mechanism | Wear |
| | Jamming |
| | Rust |
| | Other faults |
| Valve rod | Wear |
| | Rust |
| | Deformation |
| . . . | . . . |

Generally, when a device is faulty, the operation and maintenance processing personnel on a production line send a fault phenomenon and an experimental record on site to a system (for example, in a form of fault data or work orders) and then store the same, and the fault handling specialists or technical personnel analyze the work order information sent by the operation and maintenance processing personnel on a production line and locate a faulty part by experience, and finally provide a standard fault cause and a solution. When the operation and maintenance personnel on a production line cannot directly handle with a fault condition on site, they need to contact with the corresponding fault handling specialists or technical personnel online and describe the on-site condition orally or in writing. This consumes a large amount of time and labor, greatly reduces fault handling efficiency, and prolongs an entire fault solution period. Similar part faults may occur in the same type of devices from different users (for example, on different sites) and are usually described by overhaul personnel in a similar way, leaving many repeated work orders in the system. When a repeated condition occurs, personnel on a production line still need to strongly depend on specialists doing background processing, and this repeated process is very labor-consuming. In addition, because the operation and maintenance processing personnel on a production line do not have excellent summarization ability, there are usually various oral descriptions of phenomena in a work order library, data records for the same type of phenomena are repeated several times, and a final processing result quite depends on expression ability of the personnel on a production line.

In contrast, according to the embodiments of the present disclosure, existing fault data (for example, the existing historical work order library) can be used to obtain a model that can determine the involved faulty part and the involved fault type based on the input fault phenomenon. In this way, determination time can be saved for technical personnel, solutions are more accurately provided, and non-professional personnel conveniently and rapidly locate the problems. Particularly, even when a fault phenomenon text is an oral text, a faulty part and a fault type can still be accurately recognized.

The following describes a variant example of a training method for a fault recognition model according to an embodiment of the present disclosure.

According to some embodiments, training a fault recognition model may include: training the fault recognition model by using at least a first loss function and a second loss function, where the first loss function is used to identify a difference between a label that is output by the model and a real label, and the second loss function is used to identify difference between parameters of the first label and a second label that are output by the model. In such an embodiment, in addition to the loss function ("the first loss function") in supervised classification, an additional loss function is added to ensure parameter similarity between the first label and the second label (for example, the parent label and the child label in the results of the two-level hierarchical structure) that are output. Therefore, it can be ensured that a classification result of the fault type in two-level classification results obtained in this way is a classification result specific to the faulty part, that is, a fault type not specific to the faulty part does not occur in the faulty part.

According to some embodiments, the first loss function may be a cross entropy loss function. The second loss function may be a mean square error (L2) loss function. The cross entropy loss function can make different classification results as discrete as possible and keep same classification results as similar as possible. The additional L2 loss function can ensure parameters of the first label and the second label as similar as possible, thereby ensuring orderliness of two-level labels or two-level lists that are output.

The following describes an example of setting a loss function. For the purpose of distinguishing, each pair of labels that are output are referred to as a parent label and a child label, and difference between parameters of the labels is calculated as: param_diffresult=(Sum((parent_params−child_params)^2))^0.5, where parent_params is a parameter of the parent label that is obtained by a neural network, and child_params is a parameter of the child label.

Afterwards, the loss function is updated to: L2loss=L2loss+param_diffresult.

In an example, a total loss function of the neural network may be recorded as: Loss=cross_entropy+penalty*L2loss, where cross_entropy is a cross entropy for a classification model. In a more specific example, a penalty value may be set as: penalty=1e−5. Those skilled in the art can understand that selection and the like of a function type and a parameter value herein are merely an example, and the present disclosure is not limited thereto.

Those skilled in the art will understand that the fault recognition model in this specification may be implemented by various common word processing models and classification models. For example, the fault recognition model may be composed of a neural network language model suitable for word processing and a fully connected layer. Such a neural network can be trained to obtain a semantic relation among words, for example, an entity class and an entity relationship, so that fault classification can be implemented based on descriptive words.

According to some embodiments, generating the first sample set based on the first fault data set includes: determining a plurality of faulty parts and a fault type corresponding to each of the plurality of faulty parts by processing the fault recognition result in the fault data of the first fault data set. For example, a plurality of two-level label structures can be generated, where a parent label of each two-level label structure is a faulty part, and a child label is a fault type specific to the faulty part. Then, the method may include: generating a first sample set by associating the fault description text, the corresponding faulty part, and the corresponding fault type in the fault data of the first fault data set as a sample.

Processing the fault recognition result in the fault data of the first fault data set may include: performing standardization processing on the faulty part and a fault mode, for example, deduplication and combining of similar expression. In this way, an aggregated list of parts and an aggregated fault mode list can be obtained. After that, a device fault phenomenon is extracted from the fault data and integrated with data such as a real faulty part and the fault mode into training set data (and development set data, test set data, and the like).

According to some embodiments, generating the first sample set may further include: providing, in response to a number of samples having a specific faulty part and a specific fault type being less than a threshold, additional associated fault description texts for the specific value by at least one of the following operations: synonym replacement, Chinese-English translation, word sequence exchanging, word insertion, word deletion, and the like. It can be understood that the present disclosure is not limited thereto. Moreover, those skilled in the art will understand that other word processing methods for synonym transformation of words are also applicable to the method according to the embodiments of the present disclosure.

For phenomena such as sample unbalance, a data augmentation method is used to provide data in a minority class as a supplement. Therefore, each faulty part and a data amount of the fault type corresponding to the corresponding part can meet training requirements.

For example, when the number of samples with a value of a two-level label structure being "ground fault of windings" is less than a threshold (for example, 10, 50, and 100), processing such as translation, synonym replacement, and word addition and deletion are performed on existing phenomenon descriptions (for example, "sparks occurring") and the like to generate more phenomenon description texts, and the phenomenon description texts are associated with two-level label structures to generate samples to increase the number of samples, thereby increasing data balance of the entire sample set.

According to some embodiments, the training method may further include: after training the fault recognition model, obtaining a second fault data set. The second fault data set is different from the first fault data set. Afterwards, a second sample set is generated based on the second fault data set, and a subset of the first sample set and a subset of the second sample set are used to train the fault recognition model again.

Through introduction of concepts of online learning and incremental learning, when a new condition occurs or a part that has never appeared in the historical work orders appears, the model can also be trained and continuously updated based on real-time new data flow fed back by the specialists. The model can use a priori knowledge obtained through learning on an existing class and learn a new class while keeping the knowledge of the existing class that has been learned, and finally can well perform on both the new class and the existing class.

According to one or more embodiments of the present disclosure, with a text multi-classification technology in combination with a natural language processing and deep learning capability, a method for rapidly determining a faulty part and a fault cause involved in an on-site fault work order based on fault data such as a historical work order library can be implemented. Because a large amount of work order library data has been accumulated, the model can be trained without performing manual annotation again.

Figure 3:
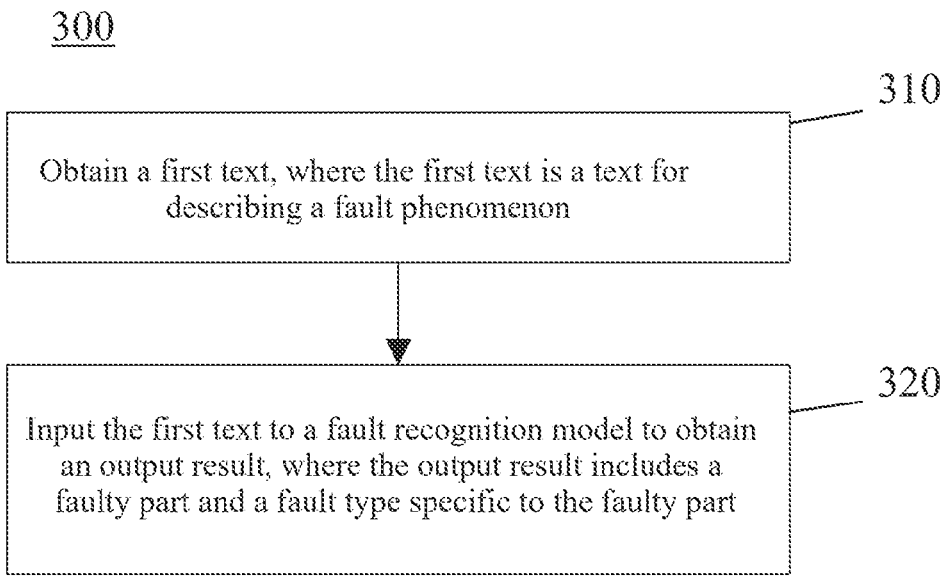
FIG. 3 is a flowchart of a fault recognition method according to an embodiment of the present disclosure.

The following describes, with reference to FIG. 3, a fault recognition method 300 according to an embodiment of the present disclosure.

At step 310, a first text is obtained. The first text is a text for describing a fault phenomenon. For example, the first text may be a fault description text extracted from a work order to be processed, or may be a paraphrased text in another form described by an on-site worker.

At step 320, the first text is input to the fault recognition model trained by using the method according to an embodiment of the present disclosure, to obtain an output result. The output result includes a faulty part and a fault type corresponding to the faulty part.

By recognizing a fault based on a trained model, a faulty part and a fault mode can be rapidly and automatically recognized, thereby shortening a solution period for a device fault problem, improving problem handling efficiency, shortening human thinking time, and emancipating a large amount of labor. With such a method, the operation and maintenance personnel on a production line can determine a specific faulty part and a specific fault mode as soon as possible based on the device fault condition on site. According to some optional embodiments, the model may be further trained to be capable of obtaining a historical handling method corresponding to the faulty part and the fault mode. In addition, according to some optional embodiments, with the concept of incremental learning, the model that has been well trained in the historical work order library can still learn a faulty part or a fault type in new work orders subsequently and successively obtained on site that does not exist in the historical work order library and can learn the new knowledge while keeping the existing learned model capability. In addition, because faulty parts and fault phenomena that may occur in a same type of devices are usually quite similar, this method is universally applicable to various scenarios and has high portability among different types of devices and different fault scenarios.

Figure 4:
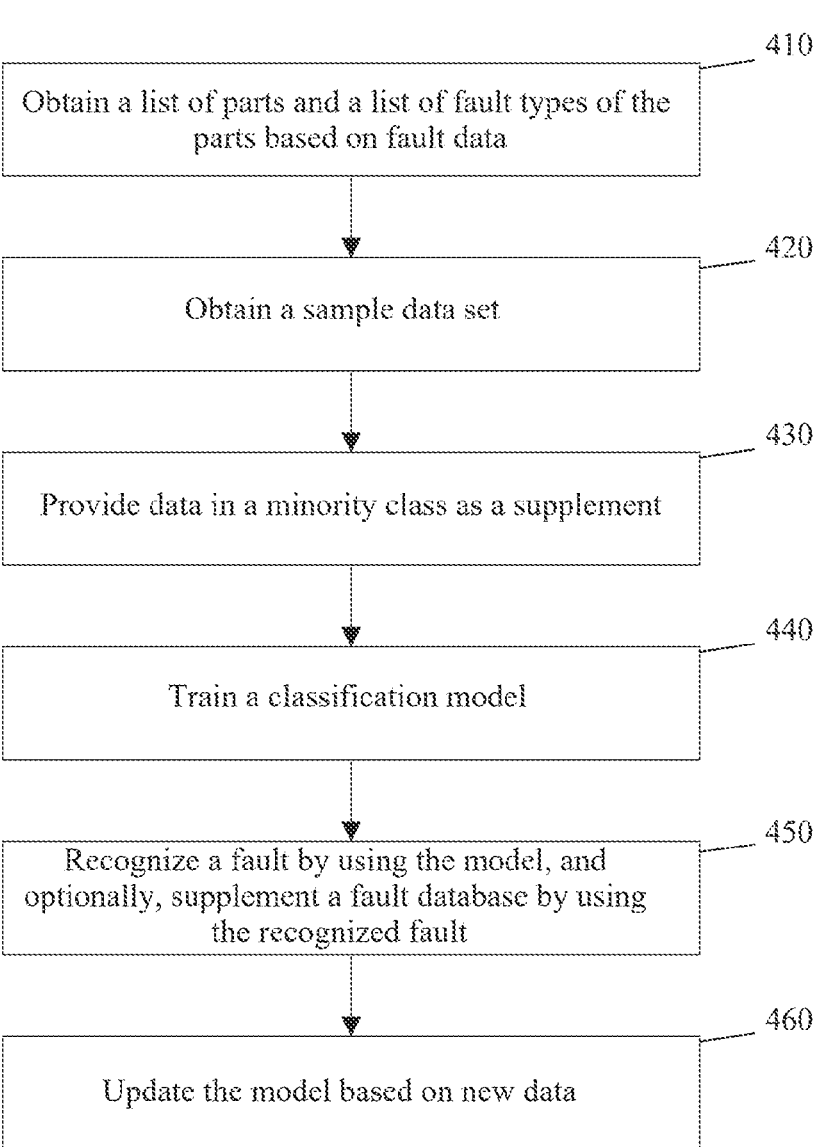
FIG. 4 is a flowchart of training and use of a fault recognition model according to another embodiment of the present disclosure.

The following describes, in conjunction with FIG. 4, a flowchart of training and use of an example model according to another embodiment of the present disclosure.

At step 410, a list of parts and a list of fault types of the parts are obtained based on fault data. For example, a device fault phenomenon record, a faulty part, and a part fault type can be obtained based on historical work order information and aggregated to obtain the list of parts and the list of fault types of the parts. For example, the historical work order information may be historical work order information read in a power plant background system. The work order information may include a real faulty part and a standard part fault type.

At step 420, a sample data set is obtained. For example, data cleaning is performed on device fault phenomenon record description to filter out redundant information such as work order numbers, device IDs, and processing time to obtain a cleaned fault phenomenon record text. Afterwards, the cleaned fault phenomenon record text is integrated with data such as the real faulty part and the part fault type in proportion into a sample data set that may include, for example, training set data, development set data, and test set data.

At step 430, data in a minority class is provided as a supplement. In a case of a sample unbalance phenomenon, a data augmentation method such as synonym replacement and Chinese-English translation can be used to provide data in a minority class as a supplement, ensuring that each faulty part and a data amount of the fault type corresponding to the part meet training requirements.

At step 440, a classification model is trained. A multi-label classification model constructed based on a language recognition model and a fully connected layer can be used, or other suitable classification models can also be used. A final classification model is trained, evaluated, and selected for the foregoing training set data and the foregoing development set data.

At step 450, a fault is recognized by using the model, and optionally, a fault database is supplemented by using the recognized fault. For example, in actual use, personnel on a production line input a device fault phenomenon obtained in an experiment to the model, and then a part classification result and a fault type classification result of the model can be obtained on site. After that, new work order content and a new class can be further input to a system (for example, after being further determined by the specialists or technical personnel) to supplement a work order information library.

At step 460, the model is updated based on new data. With the concepts of online learning and incremental learning, when a new condition occurs or a part that has never appeared in the historical work orders appears, the model can be trained and continuously updated based on real-time new data flow fed back by the specialists.

According to the embodiments of the present disclosure, response time to on-site problems can be shortened, dependence on the technical personnel is reduced, and fault recognition and removal efficiency is improved.

According to one or more embodiments of the present disclosure, by historical work order library, a faulty part (for example, a battery, a conventional mechanism, and a limit switch) and a fault type (for example, insufficient battery level, damage, and failure to operate) can be automatically obtained. The hierarchical classification model trained according to the embodiments of the present disclosure can automatically learn a mapping process from work order description to the faulty part and fault type in the historical work order library based on the fault description and experiment record. In this way, a capability of automatically classifying faulty parts and fault modes is implemented, and a faulty part and a fault type that may cause the phenomenon can be pointed out. Further, the model can also be trained to return to a historical suggested processing method. Therefore, the model can rapidly respond and solve problems, emancipate labor of the specialists, and improve on-site fault handling efficiency while reducing or eliminating dependence on manual processing of the specialists. In addition, the model can avoid incapability in the case of a part having not appear in the work order library caused by absolute dependence on the historical work order library.

Figure 5:
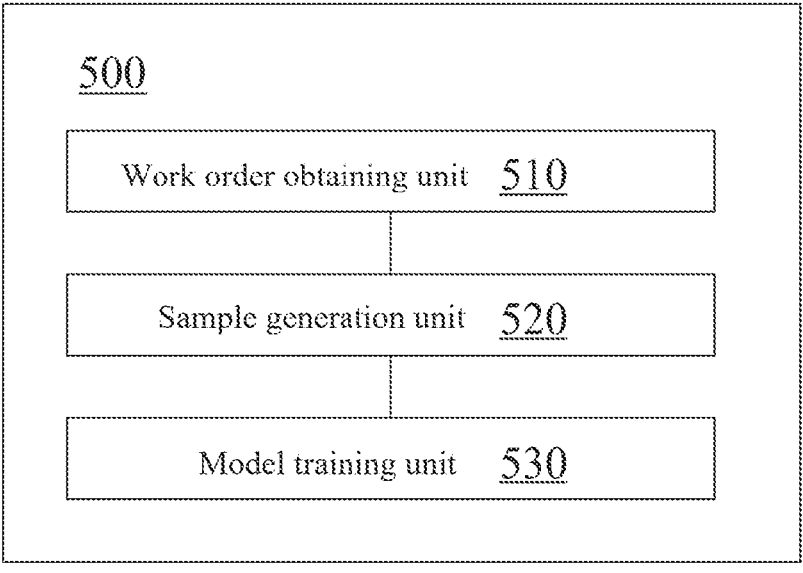
FIG. 5 is a structural block diagram of a training apparatus for a fault recognition model according to an embodiment of the present disclosure.

The following describes, in conjunction with FIG. 5, a training apparatus 500 for a fault recognition model according to an embodiment of the present disclosure. The apparatus 500 may include a work order obtaining unit 510, a sample generation unit 520, and a model training unit 530. The work order obtaining unit 510 may be configured to obtain a first fault data set. The sample generation unit 520 may be configured to generate a first sample set based on the first fault data set, where each sample in the first sample set includes a fault description text, a corresponding faulty part, and a corresponding fault type. The model training unit 530 may be configured to use fault description texts of at least one sample in the first sample set and at least one sample in the second sample set as inputs to a fault recognition model, and adjust parameters of the fault recognition model again.

According to some embodiments, the model training unit 530 may include: a unit for training the fault recognition model by using at least a first loss function and a second loss function, where the first loss function is used to identify a difference between a label that is output by the model and a real label, and the second loss function is used to identify difference between parameters of the first label and a second label that are output by the model.

According to some embodiments, the first loss function may be a cross entropy loss function, and the second loss function may be an L2 loss function.

According to some embodiments, the fault recognition model may include a language recognition model and a fully connected layer.

According to some embodiments, the sample generation unit 520 may include: a unit for determining a plurality of faulty parts and a fault type corresponding to each of the plurality of faulty parts by processing the fault recognition result in the fault data of the first fault data set; and a unit for generating a first sample set by associating the fault description text, the corresponding faulty part, and the corresponding fault type in the fault data of the first fault data set as a sample.

According to some embodiments, the sample generation unit 520 may further include a unit for providing, in response to a number of samples having a specific faulty part and a specific fault type being less than a threshold, additional associated fault description texts for the specific value by at least one of the following operations: synonym replacement, Chinese-English translation, sequence exchanging, insertion, deletion, and the like.

According to some embodiments, the apparatus 500 may further include: a unit for after training the fault recognition model, obtain a second fault data set, where the second fault data set is different from the first fault data set; a unit for generating a second sample set based on the second fault data set; and a unit for using a subset of the first sample set and a subset of the second sample set to train the fault recognition model again.

Figure 6:
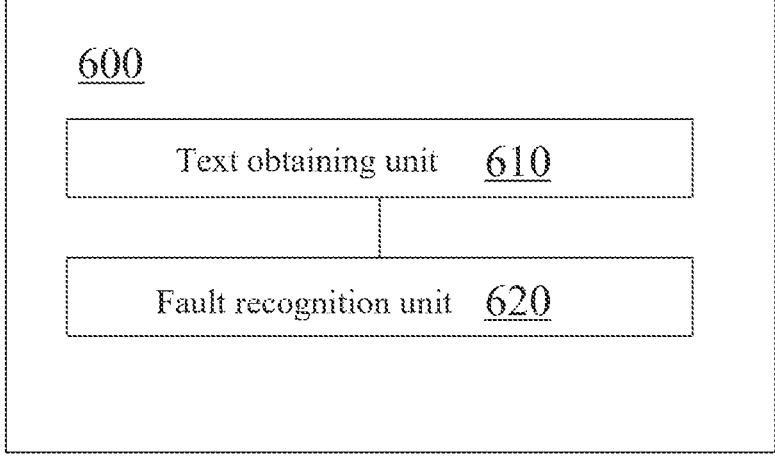
FIG. 6 is a structural block diagram of a fault recognition apparatus according to an embodiment of the present disclosure.

The following describes, in conjunction with FIG. 6, a fault recognition apparatus 600 according to an embodiment of the present disclosure. The apparatus 600 may include a text obtaining unit 610 and a fault recognition unit 620. The text obtaining unit 610 may be configured to obtain a first text, where the first text is a text for describing a fault phenomenon. The fault recognition unit 620 may be configured to input the first text to the fault recognition model trained by using the fault recognition model according to the embodiments of the present disclosure, to obtain an output result. The output result includes a faulty part and a fault type corresponding to the faulty part.

In the technical solutions of the present disclosure, collecting, storage, use, processing, transmitting, providing, disclosing, etc. of personal information of a user involved all comply with related laws and regulations and are not against the public order and good morals.

According to the embodiments of the present disclosure, there are further provided an electronic device, a readable storage medium, and a computer program product.

Figure 7:
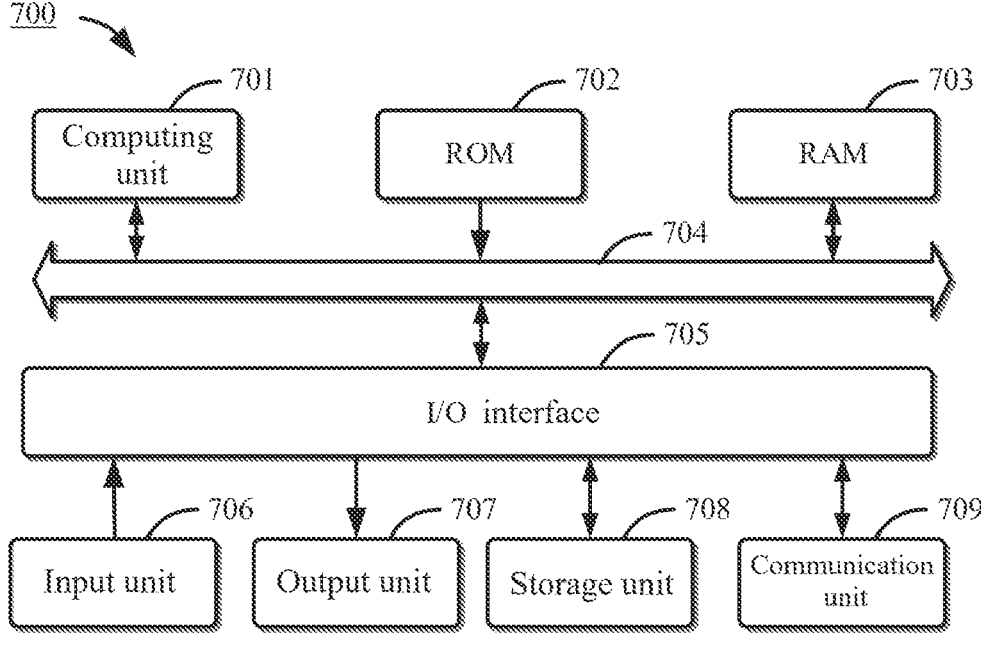
FIG. 7 is a structural block diagram of an example electronic device that can be used to implement an embodiment of the present disclosure.

Referring to FIG. 7, a structural block diagram of an electronic device 700 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the device 700 includes a computing unit 701, which may perform various appropriate actions and processing according to a computer program stored in a read-only memory (ROM) 702 or a computer program loaded from a storage unit 708 to a random access memory (RAM) 703. The RAM 703 may further store various programs and data required for the operation of the device 700. The computing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, an output unit 707, the storage unit 708, and a communication unit 709. The input unit 706 may be any type of device capable of entering information to the device 700. The input unit 706 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 707 may be any type of device capable of presenting information, and may include, but is not limited to, a display, a speaker, a video/audio output terminal, a vibrator, and/or a printer. The storage unit 708 may include, but is not limited to, a magnetic disk and an optical disc. The communication unit 709 allows the device 700 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 802.11 device, a Wi-Fi device, a WiMax device, a cellular communication device, and/or the like.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 performs the various methods and processing described above, for example, the methods 200, 300, and 400 or other variants. For example, in some embodiments, the methods 200, 300, and 400 or other variants may be implemented as a computer software program, which is tangibly contained in a machine-readable medium, such as the storage unit 708. In some embodiments, a part or all of the computer program may be loaded and/or installed onto the device 700 via the ROM 702 and/or the communication unit 709. When the computer program is loaded onto the RAM 703 and executed by the computing unit 701, one or more steps of the methods 200, 300, and 400 or other variants described above may be performed. Alternatively, in other embodiments, the computing unit 701 may be configured, by any other suitable means (for example, by means of firmware), to perform the methods 200, 300, and 400 or other variants.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems, and devices described above are merely example embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A computer-implemented training method for a fault recognition model, comprising:

obtaining a first fault data set, wherein each piece of fault data in the first fault data set comprises at least a fault phenomenon and a fault recognition result;

generating a first sample set based on the first fault data set, wherein each sample in the first sample set comprises a fault description text, a corresponding faulty part, and a corresponding fault type;

outputting, by a fault recognition model and by using the fault description text of the sample in the first sample set as an input, a two-level label structure comprising a first label as a parent label and a second label as a child label, wherein the first label is the faulty part corresponding to input fault description text, and wherein the second label is the fault type corresponding to the faulty part; and adjusting parameters of the fault recognition model by using at least a first loss function and a second loss function, wherein a difference between the parent label of the two-level label structure and a real label is identified based on the first loss function, and wherein a difference between the parent label and the child label of the two-level label structure is identified based on the second loss function.

2. The method according to claim 1, wherein the first loss function is a cross entropy loss function, and wherein the second loss function is a mean square error loss function.

3. The method according to claim 1, wherein generating a first sample set based on the first fault data set comprises:

determining a plurality of faulty parts and a fault type corresponding to each of the plurality of faulty parts by processing the fault recognition result in the fault data of the first fault data set; and generating a first sample set by associating the fault description text, the corresponding faulty part, and the corresponding fault type in the fault data of the first fault data set as a sample.

4. The method according to claim 3, wherein generating a first sample set based on the first fault data set further comprises:

providing, in response to a number of samples having a specific faulty part and a specific fault type being less than a threshold, additional associated fault description texts for the specific faulty part and the specific fault type by at least one of the following operations: synonym replacement, Chinese-English translation, word sequence exchanging, and word deletion.

5. The method according to claim 1, further comprising:

after adjusting parameters of the fault recognition model, obtaining a second fault data set, wherein the second fault data set is different from the first fault data set;

generating a second sample set based on the second fault data set; and further adjusting the parameters of the fault recognition model by using fault description texts of at least one sample in the first sample set and at least one sample in the second sample set as inputs to the fault recognition model.

6. A fault recognition method, comprising:

obtaining a first text, wherein the first text is a text for describing a fault phenomenon; and inputting the first text to the fault recognition model trained by using the method according to claim 1, to obtain an output result, wherein the output result comprises a faulty part and a fault type corresponding to the faulty part.

7. An electronic device, comprising:

at least one processor; and a memory communicatively connected to the at least one processor, wherein the memory stores instructions executable by the at least one processor, and when executed by the at least one processor, the instructions cause the at least one processor to perform processing comprising:

obtaining a first fault data set, wherein each piece of fault data in the first fault data set comprises at least a fault phenomenon and a fault recognition result;

generating a first sample set based on the first fault data set, wherein each sample in the first sample set comprises a fault description text, a corresponding faulty part, and a corresponding fault type; and outputting, by a fault recognition model and by using the fault description text of the sample in the first sample set as an input, a two-level label structure comprising a first label as a parent label and a second label as a child label, wherein the first label is the faulty part corresponding to input fault description text, and wherein the second label is the fault type corresponding to the faulty part, wherein the instructions further cause the at least one processor to perform processing comprising adjusting parameters of the fault recognition model by using at least a first loss function and a second loss function, wherein a difference between the parent label of the two-level label structure and a real label is identified based on the first loss function, and wherein a difference between the parent label and the child label of the two-level label structure is identified based on the second loss function.

8. The electronic device according to claim 7, wherein the first loss function is a cross entropy loss function, and wherein the second loss function is a mean square error loss function.

9. The electronic device according to claim 7, wherein generating a first sample set based on the first fault data set comprises:

determining a plurality of faulty parts and a fault type corresponding to each of the plurality of faulty parts by processing the fault recognition result in the fault data of the first fault data set; and generating a first sample set by associating the fault description text, the corresponding faulty part, and the corresponding fault type in the fault data of the first fault data set as a sample.

10. The electronic device according to claim 9, wherein generating a first sample set based on the first fault data set further comprises:

providing, in response to a number of samples having a specific faulty part and a specific fault type being less than a threshold, additional associated fault description texts for the specific faulty part and the specific fault type by at least one of the following operations: synonym replacement, Chinese-English translation, word sequence exchanging, and word deletion.

11. The electronic device according to claim 7, wherein the instructions further cause the at least one processor to perform processing further comprising:

after adjusting parameters of the fault recognition model, obtaining a second fault data set, wherein the second fault data set is different from the first fault data set;

generating a second sample set based on the second fault data set; and further adjusting the parameters of the fault recognition model by using fault description texts of at least one sample in the first sample set and at least one sample in the second sample set as inputs to the fault recognition model.

12. A non-transitory computer-readable storage medium storing computer instructions, wherein the computer instructions are used to cause the computer to perform processing comprising:

obtaining a first fault data set, wherein each piece of fault data in the first fault data set comprises at least a fault phenomenon and a fault recognition result;

generating a first sample set based on the first fault data set, wherein each sample in the first sample set comprises a fault description text, a corresponding faulty part, and a corresponding fault type; and outputting, by a fault recognition model and by using the fault description text of the sample in the first sample set as an input, a two-level label structure comprising a first label as a parent label and a second label as a child label, wherein the first label is the faulty part corresponding to input fault description text, and wherein the second label is the fault type corresponding to the faulty part, wherein the computer instructions are further to cause the computer to perform processing comprising adjusting parameters of the fault recognition model by using at least a first loss function and a second loss function, wherein a difference between the parent label of the two-level label structure and a real label is identified based on the first loss function, and wherein a difference between the parent label and the child label of the two-level label structure is identified based on the second loss function.

13. The non-transitory computer-readable storage medium according to claim 12, wherein the first loss function is a cross entropy loss function, and wherein the second loss function is a mean square error loss function.

14. The non-transitory computer-readable storage medium according to claim 12, wherein generating a first sample set based on the first fault data set comprises:

determining a plurality of faulty parts and a fault type corresponding to each of the plurality of faulty parts by processing the fault recognition result in the fault data of the first fault data set; and generating a first sample set by associating the fault description text, the corresponding faulty part, and the corresponding fault type in the fault data of the first fault data set as a sample.

15. The non-transitory computer-readable storage medium according to claim 14, wherein generating a first sample set based on the first fault data set further comprises:

providing, in response to a number of samples having a specific faulty part and a specific fault type being less than a threshold, additional associated fault description texts for the specific faulty part and the specific fault type by at least one of the following operations: synonym replacement, Chinese-English translation, word sequence exchanging, and word deletion.

16. The non-transitory computer-readable storage medium according to claim 12, wherein the instructions further cause at least one processor to perform processing further comprising:

after adjusting parameters of the fault recognition model, obtaining a second fault data set, wherein the second fault data set is different from the first fault data set;

generating a second sample set based on the second fault data set; and further adjusting the parameters of the fault recognition model by using fault description texts of at least one sample in the first sample set and at least one sample in the second sample set as inputs to the fault recognition model.

* * * * *